(12) United States Patent
Shima et al.

(10) Patent No.: US 8,097,323 B2
(45) Date of Patent: Jan. 17, 2012

(54) OPTICAL RECORDING MEDIUM

(75) Inventors: Takayuki Shima, Tsukuba (JP); Yuzo Yamakawa, Tsukuba (JP); James Paul Fons, Tsukuba (JP); Junji Tominaga, Tsukuba (JP)

(73) Assignee: National Institute of Advanced Industrial Science and Technology (JP)

( * ) Notice: Subject to any disclaimer, the term of this patent is extended or adjusted under 35 U.S.C. 154(b) by 285 days.

(21) Appl. No.: 12/441,609

(22) PCT Filed: Aug. 17, 2007

(86) PCT No.: PCT/JP2007/066040
§ 371 (c)(1), (2), (4) Date: Mar. 17, 2009

(87) PCT Pub. No.: WO2008/035522
PCT Pub. Date: Mar. 27, 2008

(65) Prior Publication Data
US 2009/0269542 A1    Oct. 29, 2009

(30) Foreign Application Priority Data
Sep. 22, 2006    (JP) ................................ 2006-256726

(51) Int. Cl.
*B32B 3/02* (2006.01)
(52) U.S. Cl. .................. 428/64.1; 428/64.4; 428/64.5; 428/64.6; 430/270.11
(58) Field of Classification Search ............... None
See application file for complete search history.

(56) References Cited

U.S. PATENT DOCUMENTS

| | | | |
|---|---|---|---|
| 7,232,598 B2 * | 6/2007 | Ahn et al. .................. 428/64.4 |
| 2003/0118772 A1 | 6/2003 | Hosoda et al. ............... 428/64.4 |
| 2005/0079444 A1 | 4/2005 | Kiyono et al. ............ 430/270.13 |
| 2006/0153051 A1 * | 7/2006 | Kikukawa et al. ......... 369/275.1 |

FOREIGN PATENT DOCUMENTS

| | | |
|---|---|---|
| EP | 1 555 666 A1 | 7/2005 |
| JP | H5-258345 | 8/1993 |

(Continued)

OTHER PUBLICATIONS

International Search Report and Written Opinion mailed Nov. 20, 2007 in corresponding PCT International Application No. PCT/JP2007/066040.

(Continued)

*Primary Examiner* — Elizabeth Mulvaney
(74) *Attorney, Agent, or Firm* — Ostrolenk Faber LLP

(57) ABSTRACT

An object of the invention is to write-once record and reproduce, or only reproduce, a mark smaller than the resolution limit; obtain a high level of reproduction performance (CNR and the like); and realize a high level of reproduction durability. In the invention, between a signal reproducing functional layer composed of Sb or Te and a protecting layer there is introduced a thermally stable diffusion preventing layer, and thereby reactions between the signal reproducing functional layer and the protecting layer due to increased temperature can be prevented or suppressed while increasing reproduction durability.

7 Claims, 3 Drawing Sheets

FOREIGN PATENT DOCUMENTS

| | | |
|---|---|---|
| JP | H5-217211 | 10/1993 |
| JP | 8-007333 | 12/1996 |
| JP | 9-185846 | 7/1997 |
| JP | 2001-243657 | 9/2001 |
| JP | 2003-123315 | 4/2003 |
| JP | 2003-228883 | 8/2003 |
| JP | 2004-342287 | 12/2004 |
| JP | 2005158110 | 6/2005 |
| JP | 2007-012233 | 1/2007 |
| KR | 1020050032689 | 4/2005 |
| KR | 1020050070535 | 7/2005 |
| KR | 1020050072969 | 7/2005 |
| KR | 1020050092261 | 9/2005 |
| KR | 1020050110482 | 11/2005 |

OTHER PUBLICATIONS

Technical Digest of International Symposium on Optical Memory, Sep. 5-8, 2000, pp. 224-225.

Office Action issued on Apr. 29, 2009 in counterpart Korean Patent Application No. 10-2009-7003809, with English translation (7 pages).

Search Report issued on Apr. 15, 2009 in the counterpart Korean Patent Application No. 10-2009-7003809, with English translation (10 pages).

European Search Report dated Aug. 13, 2009 in European Patent Application No. 07 792 656.6-1214.

J. Tominaga et al., "An approach for recording and readout beyond the diffraction limit with an Sb thin film", *Applied Physics Letters*, 73(15):2078-2080 (1998).

K. Yasuda et al., "Premastered Optical Disk by Superresolution", *Jpn. J. Appl. Phys.*, 32:5210-5213 (1993).

Japanese Office Action mailed Oct. 13, 2009 for JP Appl. No. 2006-256726.

T. Kikukawa et al., "Rigid bubble pit formation and huge signal enhancement in super-resolution near-field structure disk with platinum-oxide layer", *Applied Physics Letters*, 81(25)4697-4699 (2002).

Jooho Kim et al., "Super-resolution by elliptical bubble formation with $PtO_x$ and AgInSbTe layers", *Applied Physics Letters*, 83(9)1701-1703 (2003).

\* cited by examiner

# OPTICAL RECORDING MEDIUM

CROSS-REFERENCE TO RELATED APPLICATIONS

The present application is a 35 U.S.C. §§371 national phase conversion of PCT/JP2007/066040, filed Aug. 17, 2007, which claims priority of Japanese Patent Application No. 2006-256726, filed Sep. 22, 2006. The PCT International Application was published in the Japanese language.

TECHNICAL FIELD

The present invention relates to an optical recording medium for reproducing information by irradiating laser light onto a recording mark, in particular, to an optical recording medium having an additional structure for reproducing a recording mark smaller than the resolution limit.

BACKGROUND ART

For example, an optical recording medium such as a digital video disc and a blu-ray disc is such that in a reproduction optical system with a laser light of wavelength $\lambda$ and a numerical aperture NA of an objective lens, the length of a reproducible recording mark is greater than or equal to the resolution limit ($\lambda/4NA$) with respect to a recording mark sequence in which the length of the recording mark is equal to the length of an adjacent non-recorded space.

As a method of reproducing a recording mark smaller than the resolution limit in such an optical recording medium, there has been investigated a technique for practically increasing the NA within a medium by adding, to the optical recording medium, a signal reproducing functional layer having a function to reduce the size of a laser light spot.

For example, there has been known a technique for obtaining super resolution reproduction at high carrier to noise ratio (CNR), which serves as an index of reproduction performance, with use of $Ge_2Sb_2Te_5$ as a signal reproducing functional layer material, and with utilization of a variation in the refractive index due to liquid phase formation of this material (refer to Patent Document 1). Super resolution reproduction can be experimentally obtained in the case where the power of laser light irradiation for reproduction is increased.

Super resolution reproduction at similarly high CNR can be experimentally achieved also by use of a signal reproducing functional layer material of another composition containing Sb and Te, not limited to $Ge_2Sb_2Te_5$. However, in any of these cases, there is a problem in that reproduction durability is insufficient for practical use when performing super resolution reproduction, as a result of the influence of temperature increase within the medium due to the increased power of laser light irradiation.

Patent Document 1: Japanese Unexamined Patent Application, First Publication No. H5-258345
Patent Document 2: Japanese Unexamined Patent Application, First Publication No. H5-217211
Non Patent Document 1: Technical Digest of International Symposium on Optical Memory, 2000, p. 224-225.

DISCLOSURE OF INVENTION

Problems to Solved by the Invention

An object of the present invention is to record and reproduce, or only reproduce, a mark smaller than the resolution limit; obtain a high level of reproduction performance (CNR and the like); and realize a high level of reproduction durability.

Means for Solving the Problems

An optical recording medium that performs super resolution reproduction, for example, as shown in FIG. 1 with an example of a sectional view thereof, includes a recording layer, a signal reproducing functional layer (also called a mask layer in some cases), a protecting layer, and a reflecting layer. Laser light irradiation for reproduction causes an increase in temperature of the signal reproducing functional layer, and consequently super resolution reproduction can be obtained. However, this may causes reactions between the signal reproducing functional layer and the adjacent protecting layer due to the increase in temperature, and this influences the super resolution reproduction performance of the signal reproducing functional layer. As a result, sufficient reproduction durability cannot be ensured.

The above mentioned reaction occurs in the case where a composition ($ZnS$—$SiO_2$) of $ZnS$ and $SiO_2$ is used as a material for the protecting layer for example. However, from a viewpoint of a high level of its light transmission characteristic, a low level of its thermal conductivity characteristic, and a low level of its thermal expansion characteristic, $ZnS$—$SiO_2$ is an often used material for the protecting layer in write-once type and rewritable type optical recording media.

As shown in the sectional view of FIG. 2, in the present invention, between the signal reproducing functional layer and the protecting layer there is introduced a thermally stable diffusion preventing layer, and thereby reactions between the signal reproducing functional layer and the protecting layer due to increased temperature can be prevented or suppressed while increasing reproduction durability.

Incidentally, there has been widely known a method of introducing a new protecting layer adjacent to a phase change recording layer in order to improve the number of repeatable rewritings on the phase change recording layer (refer to Patent Document 2). This differs from the present invention in the configuration of the optical recording medium because of the following reason due to difference in the purpose.

As for the material to be used for the signal reproducing functional layer in the present invention, the amorphous phase portion thereof becomes crystallized when irradiating a laser light for super resolution reproduction, and therefore this cannot be used as a phase change recording layer.

Moreover, there has been reported that super resolution reproduction can be performed also in a structure with $Ge_2Sb_2Te_5$ sandwiched by protecting layers (refer to Non Patent Document 1). According to the Non Patent Document 1, it is reported that when reproducing a 100 nm recording mark, which is smaller than the resolution limit, with use of an optical system of $\lambda=403$ nm and NA=0.6, the obtained CNR was no more than 15 dB. Also in the case of using the structure disclosed in Patent Document 2, a reproduction CNR characteristic similar to that in Non Patent Document 1 is expected to be found.

That is to say, the phase change recording layer portion of Patent Document 2, in addition to its use as a conventional recording layer, can be applied as a signal reproducing functional layer for super resolution reproduction. However, it cannot sufficiently exert its function for both recording and super resolution reproduction at the same time, and it cannot serve as an optical recording medium for practical super resolution reproduction at least in its single use. In the present invention, the configuration is such that the phase change recording layer is utilized only as a signal reproducing functional layer for super resolution reproduction, and is combined with another appropriate recording portion. The recording portion specifically refers to a write-once type recording layer or preliminarily formed phase recording pits.

Effect of the Invention

In the present invention there is provided a super resolution reproduction optical recording medium in which new layers are provided before and after a signal reproducing functional layer for super resolution reproduction and these are combined with an appropriate recording portion, to thereby: obtain an effect of satisfying both a high level of reproduction performance and a high level of reproduction durability; and, as a result thereof, enable its practical application.

DESCRIPTION OF THE REFERENCE SYMBOLS

1 Substrate
2 Protecting layer
3 Recording layer
4 Signal reproducing functional layer
5 Reflecting layer
6 Diffusion preventing layer

BEST MODE FOR CARRYING OUT THE INVENTION

Hereunder, a best mode for carrying out the present invention is illustrated.

Figure 2:
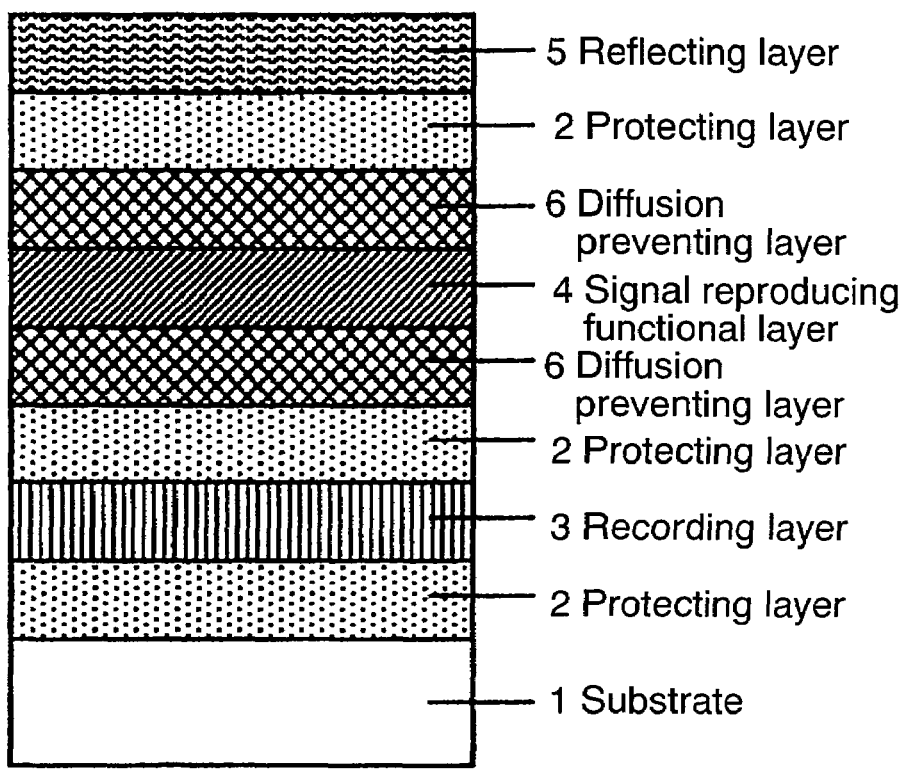
FIG. 2 is an example of a configuration of an optical recording medium for performing super resolution reproduction according to the present invention.

FIG. 2 shows a configuration example of an optical recording medium for super resolution reproduction according to the present invention. The optical recording medium includes; a substrate, a recording layer, a protecting layer, a diffusion preventing layer, a signal reproducing functional layer, a diffusion preventing layer, a protecting layer, and a reflecting layer.

Preferred materials for the signal reproducing functional layer include Sb or Te (meaning Sb, Te, or (Sb and Te) in the present specification), and specific examples thereof include Sb—Te, Ge—Te, Ge—Sb—Te, and Zn—Sb. Furthermore, these materials may contain Ag, In, Ge, or the like as an impurity.

The preferred material for the protecting layer is ZnS—$SiO_2$, and the preferred mixture ratio of ZnS and $SiO_2$ (ZnS:$SiO_2$) falls in a range between 90 mol %:10 mol % and 60 mol %:40 mol %.

The material for the diffusion preventing layer essentially needs to be able to prevent or suppress reactions between the signal reproducing functional layer and the protecting layer due to temperature increase, and therefore various kinds of thermally stable materials may be used therefor. Specific examples of the preferred material include nitride, oxide, and carbide materials of Ge, Zr, Ce, Cr, Si, Al, Ti, and Ta.

The diffusion preventing layers before and after the signal reproducing functional layer do not necessarily have to be formed with the same material, and may be respectively formed with materials selected from the materials listed above.

One of the primary roles of the reflecting layer is to adjust reflectance of the optical recording medium, and therefore various kinds of metallic materials such as Ag, Al, Au, Cu, Pt, Pd, Ti, W, and Mo, or an alloyed metal of these materials may be used therefor. Moreover, the reflecting layer does not necessarily have to be formed.

In FIG. 2, there are: the recording layer; the signal reproducing functional layer and the diffusion preventing layers; and the reflecting layer, provided in this order from the substrate side through the protecting layers. However, the order of: the recording layer; and the signal reproducing functional layer and the diffusion preventing layers, may be reversed. Moreover, in the case where recording or reproduction with laser light is not to be performed through the substrate, the reflecting layer may be formed on the side closest to the substrate side.

Any material that has an optical constant that is irreversibly changed by laser light irradiation, and that does not allow loss of recordings formed on the recording layer at the time of laser light irradiation for super resolution reproduction, may be used as a material for the recording layer.

The material for the substrate is not limited in particular, and glass, plastic, or the like may be used therefor. In the case where recording or reproduction with laser light is not to be performed through the substrate, the substrate may be optically opaque to the laser light.

Without forming the recording layer in FIG. 2, the medium may be made as a reproduction dedicated type medium with use of a substrate having recording pits preliminarily formed.

Example 1

As shown in FIG. 2, on a polycarbonate substrate there were formed: a 110 nm protecting layer formed with $(ZnS)_{85}(SiO_2)_{15}$ (that is, ZnS:$SiO_2$ of ZnS—$SiO_2$ is 85 mol %:15 mol %); a 4 nm recording layer formed with a composition of platinum oxide ($PtO_x$) and $SiO_2$; a 35 nm protecting layer formed with $(ZnS)_{85}(SiO_2)_{15}$; a 5 nm diffusion preventing layer formed with germanium nitride (Ge—N); a 10 nm signal reproducing functional layer formed with $Sb_3Te$; a 5 nm diffusion preventing layer formed with Ge—N; a 15 nm protecting layer formed with $(ZnS)_{85}(SiO_2)_{15}$; and a 40 nm reflecting layer formed with alloyed metal of $Ag_{98}Pd_1Cu_1$, in this order.

Comparative Example 1

Figure 1:
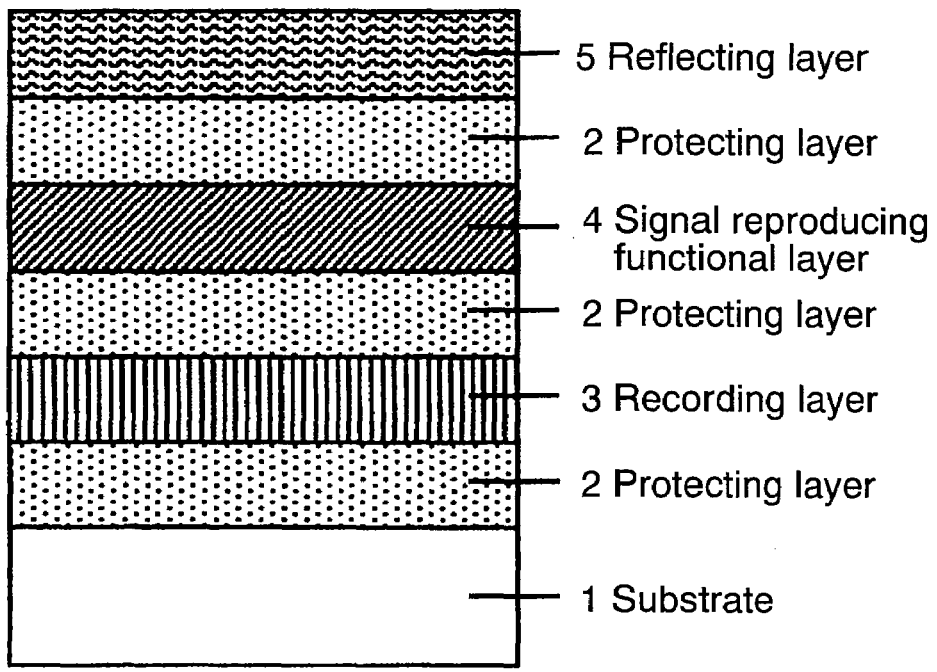
FIG. 1 is an example of a configuration of a conventional optical recording medium for performing super resolution reproduction.

As a comparative example, as shown in FIG. 1, an optical recording medium for super resolution reproduction that included no diffusion preventing layers, was formed. On a polycarbonate substrate there were formed: a 110 nm protecting layer formed with $(ZnS)_{85}(SiO_2)_{15}$; a 4 nm recording layer formed with a composition of $PtO_x$ and $SiO_2$; a 40 nm protecting layer formed with $(ZnS)_{85}(SiO_2)_{15}$; a 10 nm signal reproducing functional layer formed with $Sb_3Te$; a 20 nm protecting layer formed with $(ZnS)_{85}(SiO_2)_{15}$; and a 40 nm reflecting layer formed with $Ag_{98}Pd_1Cu_1$, in this order.

Measurements for the working example 1 and the comparative example 1 were both performed with use of an optical disc tester (DDU-1000 manufactured by Pulstec Industrial Co., Ltd.) with an optical system of $\lambda=405$ nm and NA=0.65.

On the optical recording media formed in these ways, a 100 nm mark (200 nm cycle), which is smaller than the resolution limit, was recorded at a linear velocity 4.4 m/s with laser light power 9.5 mW in the working example 1, and with laser light power 10.0 mW in the comparative example 1.

Recording is realized as a result of deformation within the medium due to primarily $PtO_x$ among the composition of $PtO_x$ and $SiO_2$, being thermally decomposed into platinum and oxygen, and this recording can be performed only once.

Figure 3:
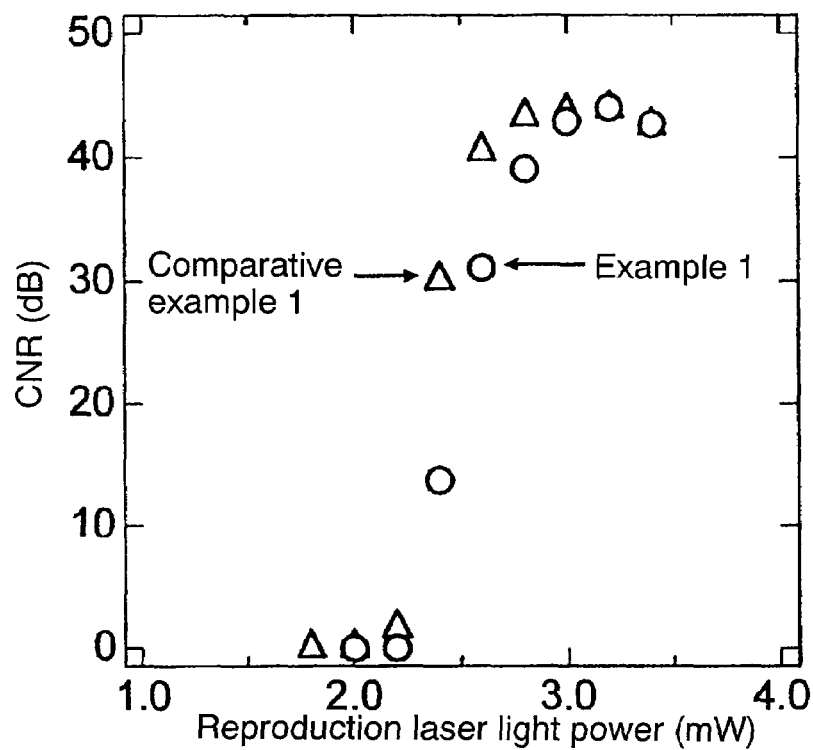
FIG. 3 is a diagram for describing the present invention, showing a relationship between reproduction laser light power and carrier to noise ratio (CNR).

Laser light power for reproduction was irradiated onto the recorded optical recording media. As a result, in both of the working example 1 and the comparative example 1, super resolution reproduction became possible with laser light power just above 2.0 mW, and the CNR observed in the proximity of laser light power 3.0 mW was approximately 44 dB as shown in FIG. 3. That is to say, also in the working example 1 with newly introduced diffusion preventing layers, it was possible to obtain a high level of CNR characteristic as with the conventional comparative example 1.

Figure 4:
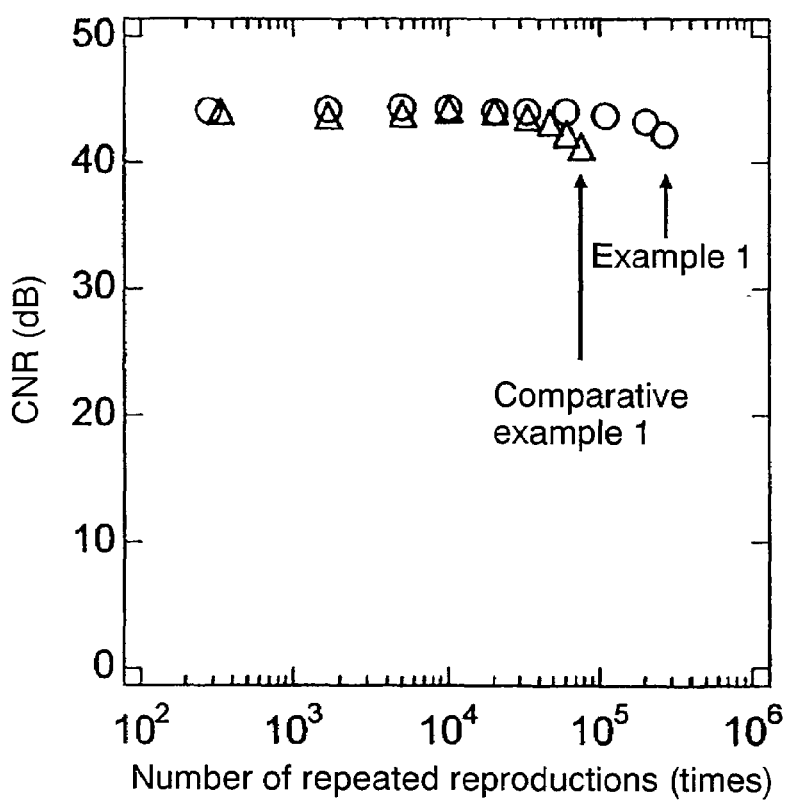
FIG. 4 is a diagram for describing the present invention, showing a relationship between the number of repetitions of super resolution reproduction and carrier to noise ratio (CNR).

Super resolution reproduction was repeatedly performed, and the number of times of performing super resolution reproduction until the CNR was reduced by 3 dB from the initial value, was measured. The results showed, as shown in FIG. 4, approximately 75,000 times in the comparative example 1 (reproduction laser light power: 2.8 mW), and approximately 268,000 times in the working example 1 (reproduction laser light power: 3.0 mW). That is to say, introduction of the diffusion preventing layers resulted in an improvement in reproduction durability in super resolution reproduction by three times or more compared to conventional reproduction durability.

Figure 5:
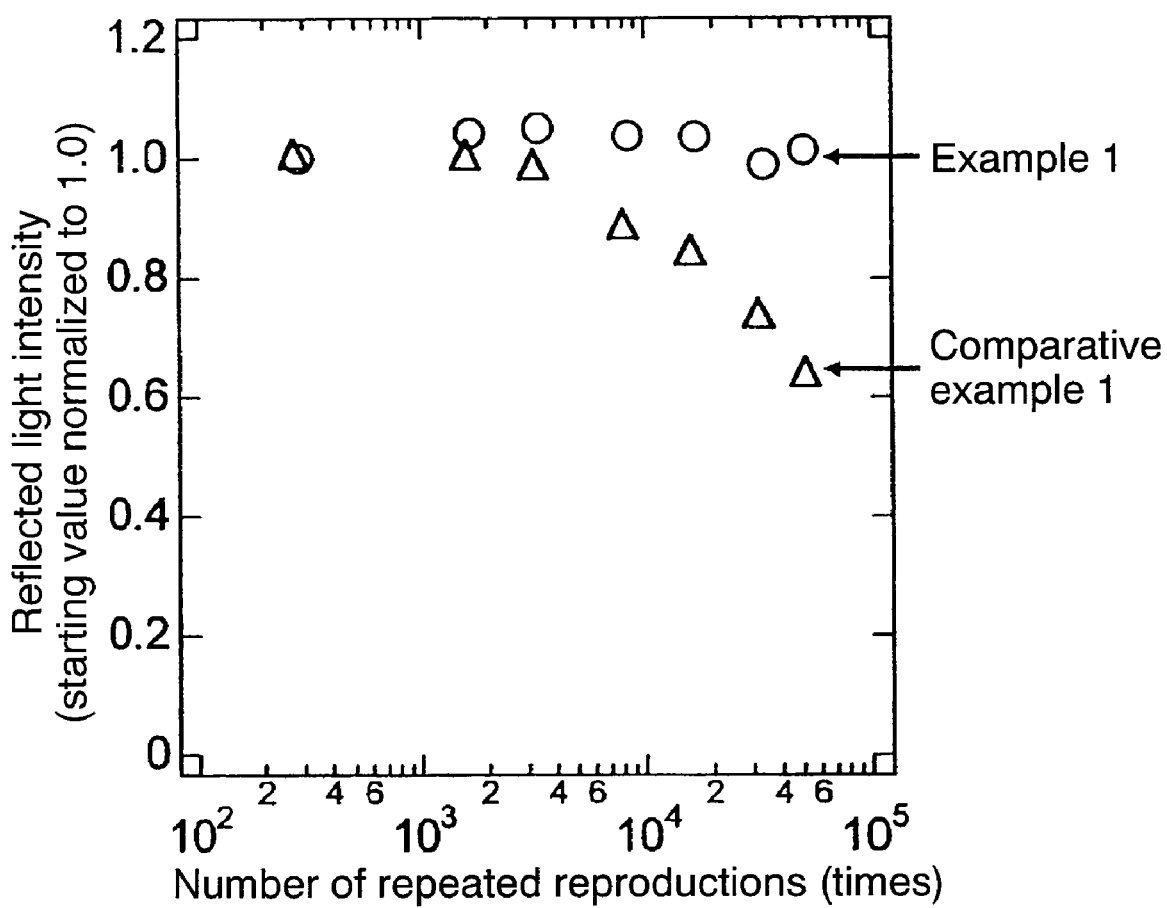
FIG. 5 is a diagram for describing the present invention, showing a relationship between the number of repetitions of super resolution reproduction and the intensity of reflected light from the medium.

Next, a sequence of compounded marks including a 100 nm (200 nm cycle) mark and a 350 nm mark (700 nm cycle) was recorded. In order to perform super resolution reproduction on a 100 nm mark portion, the reproduction laser light power the same as that in the above case of FIG. 4 was irradiated and variation in the intensity of light reflected on the medium during repeated reproduction was measured. As shown in FIG. 5, in the comparative example 1, the reflected light intensity decreased when reproduction exceeded approximately 10,000 times, whereas in the working example 1, substantially no variation was observed in reflected light intensity after approximately 50,000 times of reproduction. This is thought to be because reactions between the signal reproducing functional layer and the protecting layer due to temperature increase were prevented or suppressed as a result of introduction of the diffusion preventing layers.

Example 2

An optical recording medium was formed in which the material of the diffusion preventing layer seen in the structure of the working example 1 was changed to zirconium oxide (Zr—O). Also in the present working example 2, the aforementioned optical disc tester with an optical system of $\lambda=405$ nm and NA=0.65 was used, and a 100 nm mark (200 nm cycle), which is smaller than the resolution limit, was recorded at a linear velocity 6 m/s, with laser light power 10.5 mW.

Laser light power for super resolution reproduction was irradiated onto the recorded optical recording medium, and approximately 42 dB of CNR at 3.2 mW was obtained as a result. This reproduction was repeatedly performed, and the number of times of performing super resolution reproduction until the CNR was reduced by 3 dB from the initial value, was measured. The result of this was approximately 190,000 times. This is an improvement of more than 2.5 times that observed in the comparative example 1.

Example 3

On a substrate having recording pits preliminarily formed, there were formed: a 93 nm protecting layer formed with $(ZnS)_{85}(SiO_2)_{15}$; a 7 nm diffusion preventing layer formed with cerium oxide (Ce—O); a 15 nm signal reproducing functional layer formed with $Ag_{6.0}In_{4.4}Sb_{61.0}Te_{28.6}$; a 7 nm diffusion preventing layer formed with Ce—O; and a 93 nm protecting layer formed with $(ZnS)_{85}(SiO_2)_{15}$, in this order.

Comparative Example 2

An optical recording medium for super resolution reproduction that included no diffusion preventing layers, was formed. On a substrate having recording pits preliminarily formed, there were formed: a 100 nm protecting layer formed with $(ZnS)_{85}(SiO_2)_{15}$; a 15 nm signal reproducing functional layer formed with $Ag_{6.0}In_{4.4}Sb_{61.0}Te_{28.6}$; and a 100 nm protecting layer formed with $(ZnS)_{85}(SiO_2)_{15}$, in this order.

Measurement for both of the working example 3 and the comparative example 2 were performed with use of an optical disc tester (DDU-1000 manufactured by Pulstec Industrial Co., Ltd.) with an optical system of $\lambda=635$ nm and NA=0.60.

In the working example 3 and the comparative example 2, laser light power for super resolution reproduction was irradiated onto a 200 nm recording pit (400 nm cycle), which is smaller than the resolution limit, at a linear velocity of 6 m/s, and in both of the examples, the observed CNR was 43 dB at 3.4 mW.

This reproduction was repeatedly performed, and the number of times of performing reproduction until the CNR was reduced by 3 dB from the initial value, was measured. The result of this showed approximately 8,000 times in the comparative example 2 and approximately 20,000 times in the working example 3. That is to say, introduction of the diffusion preventing layers resulted in an improvement in reproduction durability in super resolution reproduction by 2.5 times compared to conventional reproduction durability.

The invention claimed is:

1. An optical recording medium for performing super resolution reproduction comprising:
a five-layered structure consisting of a signal reproducing functional layer, two diffusion preventing layers, and two protecting layers, the five-layered structure being supported on a substrate having recording pits preliminarily formed, wherein the signal reproducing functional layer is sandwiched between the two diffusion preventing layers, the diffusion preventing layers and the signal reproducing functional layer are sandwiched between the two protecting layers, the signal reproducing functional layer contains Sb or Te, each of the protecting layers contains ZnS, and each of the diffusion preventing layers is comprised of a nitride, or an oxide, or a carbide of an element from a group consisting of Ge, Zr, Ce, Cr, Si, Al, Ti and Ta, said diffusion preventing layers being able to prevent or suppress reaction between the signal producing functional layer and the protecting layers due to temperature increase in the signal reproducing functional layer.

2. An optical recording medium for performing super resolution reproduction comprising:

a recording layer that allows once-only recording and a five-layered structure consisting of a signal reproducing functional layer, two diffusion preventing layers, and two protecting layers, the five-layered structure being supported on a substrate, wherein the signal reproducing functional layer is sandwiched between the two diffusion preventing layers, the diffusion preventing layers and the signal reproducing functional layer are sandwiched between the two protecting layers, the signal reproducing functional layer contains Sb or Te, each of the protecting layers contains ZnS, and each of the diffusion preventing layers is comprised of a nitride, or an oxide, or a carbide of an element from a group consisting of Ge, Zr, Ce, Cr, Si, Al, Ti, and Ta, said diffusion preventing layers being able to prevent or suppress reaction between the signal producing functional layer and the protecting layers due to temperature increase in the signal reproducing functional layer.

3. An optical recording medium for performing super resolution reproduction according to claim 2, wherein said recording layer is formed with use of variation in noble metal oxide associated with thermal decomposition thereof.

4. An optical recording medium for performing super resolution reproduction according to claim 1, wherein each of the protecting layers further contains $SiO_2$, and a mixture ratio of ZnS and $SiO_2$ is in a range between 90 mol %:10 mol % and 60 mol %:40 mol %.

5. An optical recording medium for performing super resolution reproduction according to claim 2, wherein each of the protecting layers further contains $SiO_2$, and a mixture ratio of ZnS and $SiO_2$ is in a range between 90 mol %:10 mol % and 60 mol %:40 mol %.

6. An optical recording medium for performing super resolution reproduction according to claim 1, wherein the signal reproducing functional layer includes a compound selected from a group consisting of Sb—Te, Ge—Te, Ge—Sb—Te, and Zn—Sb.

7. An optical recording medium for performing super resolution reproduction according to claim 2, wherein the signal reproducing functional layer includes a compound selected from a group consisting of Sb—Te, Ge—Te, Ge—Sb—Te, and Zn—Sb.

* * * * *